(12) United States Patent  
Krueger

(10) Patent No.: US 7,026,952 B2
(45) Date of Patent: Apr. 11, 2006

(54) DOWNHOLE TELEMETRY SYSTEM USING DISCRETE MULTI-TONE MODULATION HAVING REPEATED SYMBOLS

(75) Inventor: Daniel J. Krueger, Pearland, TX (US)

(73) Assignee: Halliburton Energy Services, Inc., Houston, TX (US)

(*) Notice: Subject to any disclaimer, the term of this patent is extended or adjusted under 35 U.S.C. 154(b) by 540 days.

(21) Appl. No.: 10/371,624

(22) Filed: Feb. 21, 2003

(65) Prior Publication Data

US 2004/0164876 A1 Aug. 26, 2004

(51) Int. Cl.
*G01V 3/00* (2006.01)
(52) U.S. Cl. .............. 340/855.3; 340/855.4; 375/261; 370/476; 370/474
(58) Field of Classification Search ......... 340/855.3, 340/855.4; 375/261; 370/476, 474
See application file for complete search history.

(56) References Cited

U.S. PATENT DOCUMENTS

| | | | |
|---|---|---|---|
| 3,991,611 A | 11/1976 | Marshall, III et al. ......... 73/151 |
| 5,243,337 A | 9/1993 | Beaducel et al. ......... 340/855.3 |
| 5,331,318 A * | 7/1994 | Montgomery ............. 340/855.4 |
| 5,365,229 A | 11/1994 | Gardner et al. ........... 340/855.4 |
| 5,473,321 A * | 12/1995 | Goodman et al. ........ 340/854.9 |
| 5,594,344 A | 1/1997 | Doyle et al. ................ 324/338 |
| 5,761,206 A * | 6/1998 | Kackman .................... 370/476 |
| 5,838,727 A | 11/1998 | Lyon et al. ................. 375/261 |
| 6,252,518 B1 * | 6/2001 | Laborde ................... 340/855.4 |
| 6,580,751 B1 * | 6/2003 | Gardner et al. ............. 375/222 |
| 6,914,538 B1 * | 7/2005 | Baird et al. ............... 340/854.9 |

FOREIGN PATENT DOCUMENTS

| | | |
|---|---|---|
| EP | 0 352 869 | 1/1990 |
| EP | 0 955 744 | 11/1999 |
| WO | 99/33215 | 7/1999 |

* cited by examiner

*Primary Examiner*—Albert K. Wong
(74) *Attorney, Agent, or Firm*—Conley Rose, P.C.

(57) ABSTRACT

A downhole telemetry system and method using discrete multi-tone modulation having repeated symbols. The system includes a surface receiver, a cable, and a downhole transmitter coupled to the surface receiver via the cable. The transmitter communicates a time-domain signal to the receiver. The time-domain signal has a cyclic prefix for a symbol at least as long as the length of the symbol. The system may alternatively include the time-domain signal having a symbol followed immediately by a copy of the symbol. The method includes receiving a time-domain signal carrying desired information at specific frequencies. The signal has at least one symbol. The method includes prepending a cyclic prefix having first length to the beginning of the symbol. The cyclic prefix has a second length no longer than the first length. The method may alternatively include appending a copy of the at least one symbol to the end of the at least one symbol.

38 Claims, 4 Drawing Sheets

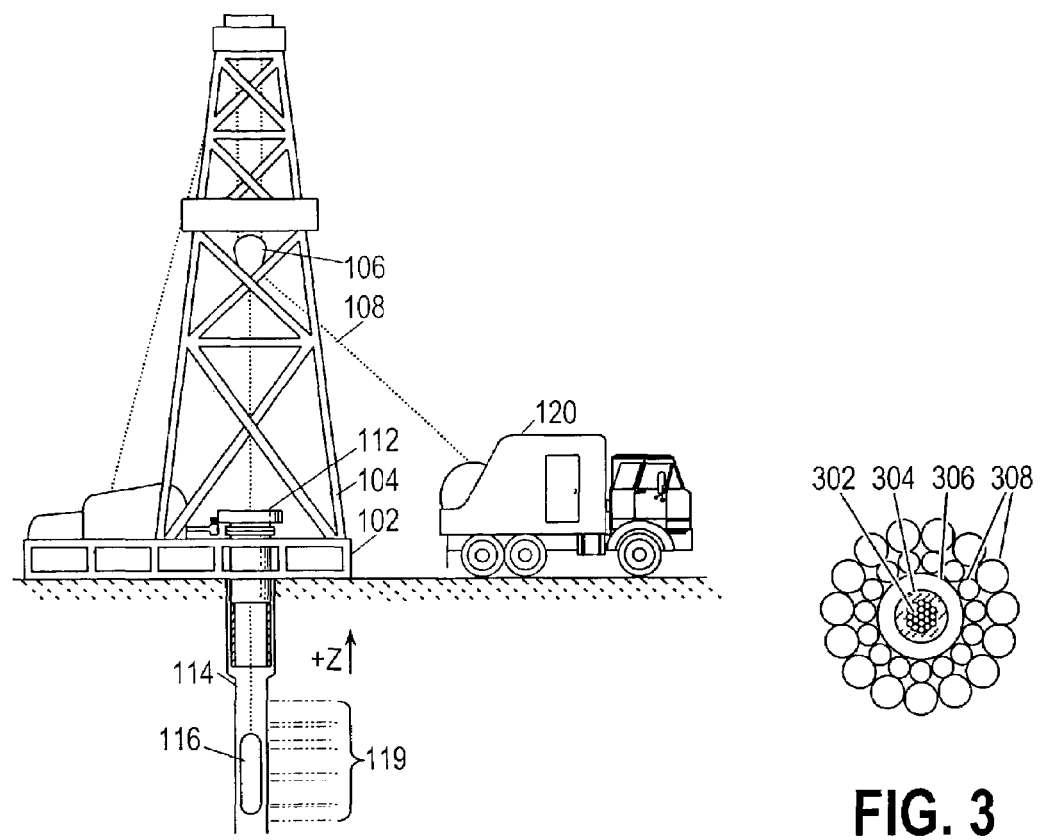
FIG. 1
FIG. 3
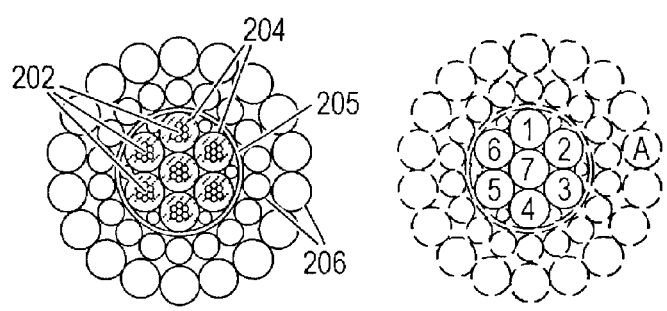
FIG. 2A    FIG. 2B    FIG. 4

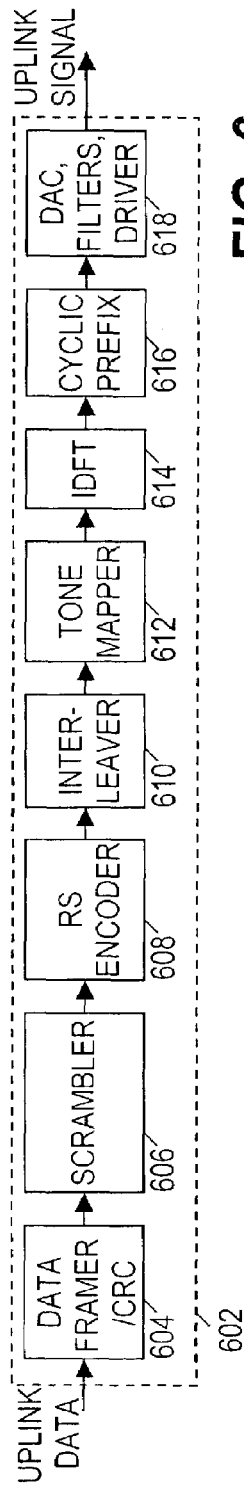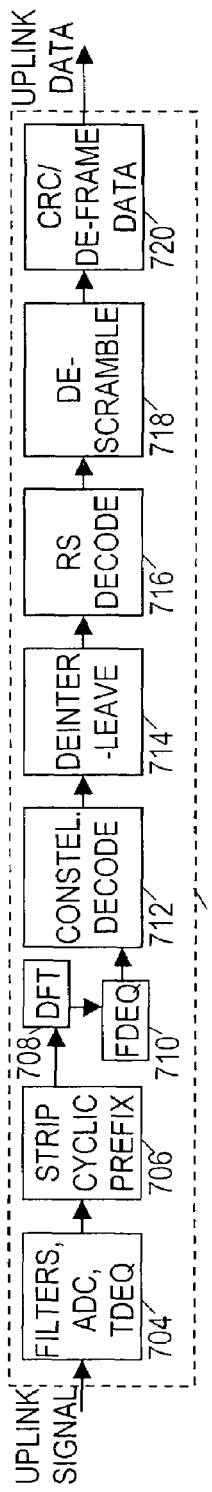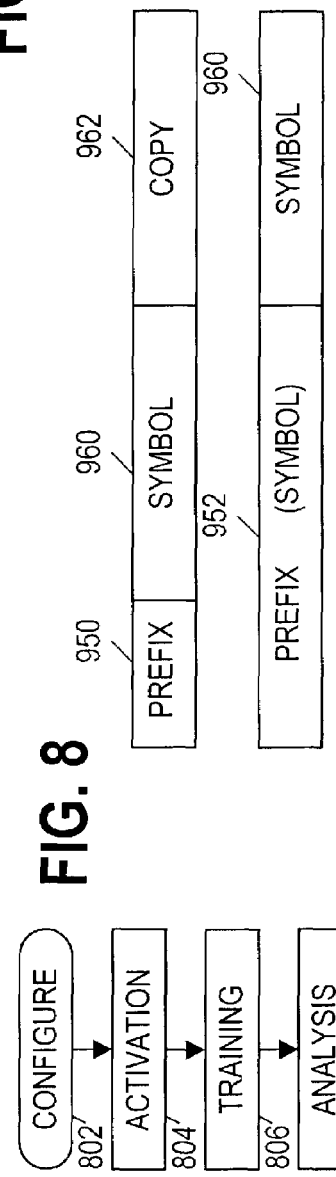
FIG. 6
FIG. 7
FIG. 8
FIG. 11

DOWNHOLE TELEMETRY SYSTEM USING DISCRETE MULTI-TONE MODULATION HAVING REPEATED SYMBOLS

BACKGROUND

1. Field of the Invention

The present invention relates generally to high speed digital data communications. More specifically, the invention relates to a high-speed communications scheme for transferring telemetry data between downhole sensors and a surface installation using discrete multi-tone modulation with repeated symbols.

2. Description of Related Art

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

An alternative method of logging is the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

Sensors or transducers typically are located at the lower end of the drill string in MWD systems. While drilling is in progress these sensors continuously or intermittently monitor predetermined drilling parameters and formation data and transmit the information to a surface detector by some form of telemetry. Typically, the downhole sensors employed in MWD applications are positioned in a cylindrical drill collar that is positioned close to the drill bit. The MWD system then employs a system of telemetry in which the data acquired by the sensors is transmitted to a receiver located on the surface. There are a number of telemetry systems in the prior art which seek to transmit information regarding downhole parameters up to the surface without requiring the use of a wireline. These telemetry systems may not support an adequate data rate.

SUMMARY

In one aspect of the present invention, a downhole telemetry system using discrete multitone modulation is provided. The system includes a surface receiver, a cable, and a downhole transmitter. The downhole transmitter is coupled to the surface receiver via the cable. The downhole transmitter communicates to the surface receiver using a time-domain signal having a cyclic prefix for a symbol at least as long as a length of the symbol.

In another aspect of the present invention, another downhole telemetry system using discrete multitone modulation is provided. This system includes a surface receiver, a cable, and a downhole transmitter coupled to the surface receiver via the cable. The downhole transmitter communicates to the surface receiver using a time-domain signal. The time-domain signal has a symbol followed immediately by a copy of the symbol.

In still another aspect of the present invention, another method of communicating with a downhole package using discrete multitone modulation is provided. This method includes receiving a time-domain signal carrying desired information at specific frequencies. The time-domain signal comprises at least one symbol. This method also includes appending a copy of the at least one symbol to the end of the at least one symbol.

In yet still another aspect of the present invention, still another method of communicating with a downhole package using discrete multitone modulation is provided. This method includes receiving a digital form of a time-domain signal that comprises at least one symbol. The at least one symbol has cyclic prefix that comprises a copy of the at least one symbol. This method also includes stripping a portion of the cyclic prefix other than the copy of the at least one symbol, and transforming the digital form using the at least one symbol and the copy of the at least one symbol.

In another aspect of the present invention, another method of communicating with a downhole package using discrete multitone modulation is provided. This method includes receiving a digital form of a time-domain signal that comprises at least one symbol. The at least one symbol has a cyclic prefix followed by a copy of the at least one symbol. The method also includes stripping the cyclic prefix from the copy of the at least one symbol, and transforming the digital form using the at least one symbol and the copy of the at least one symbol.

BRIEF DESCRIPTION OF THE DRAWINGS

For a detailed description of the preferred embodiments of the invention, reference will now be made to the accompanying drawings in which:

FIG. 1 shows a wireline sonde being run through a well;

FIGS. 2A and 2B show cross-sections of seven-conductor wireline cables;

FIG. 3 shows a cross-section of a single-conductor logging cable;

FIG. 4 shows a cross-section of composite tubing with electrical conductors embedded in the wall;

FIG. 6 shows an embodiment of a discrete multi-tone transmitter;

FIG. 7 shows an embodiment of a discrete multi-tone receiver;

FIG. 8 shows a flowchart of an embodiment of a communications channel initialization method;

FIG. 11 shows a diagram of a cyclic prefix followed by two copies of a symbol, according to one aspect of the present invention, and a cyclic prefix including a symbol followed by the symbol, according to another aspect of the present invention.

Figure 5:
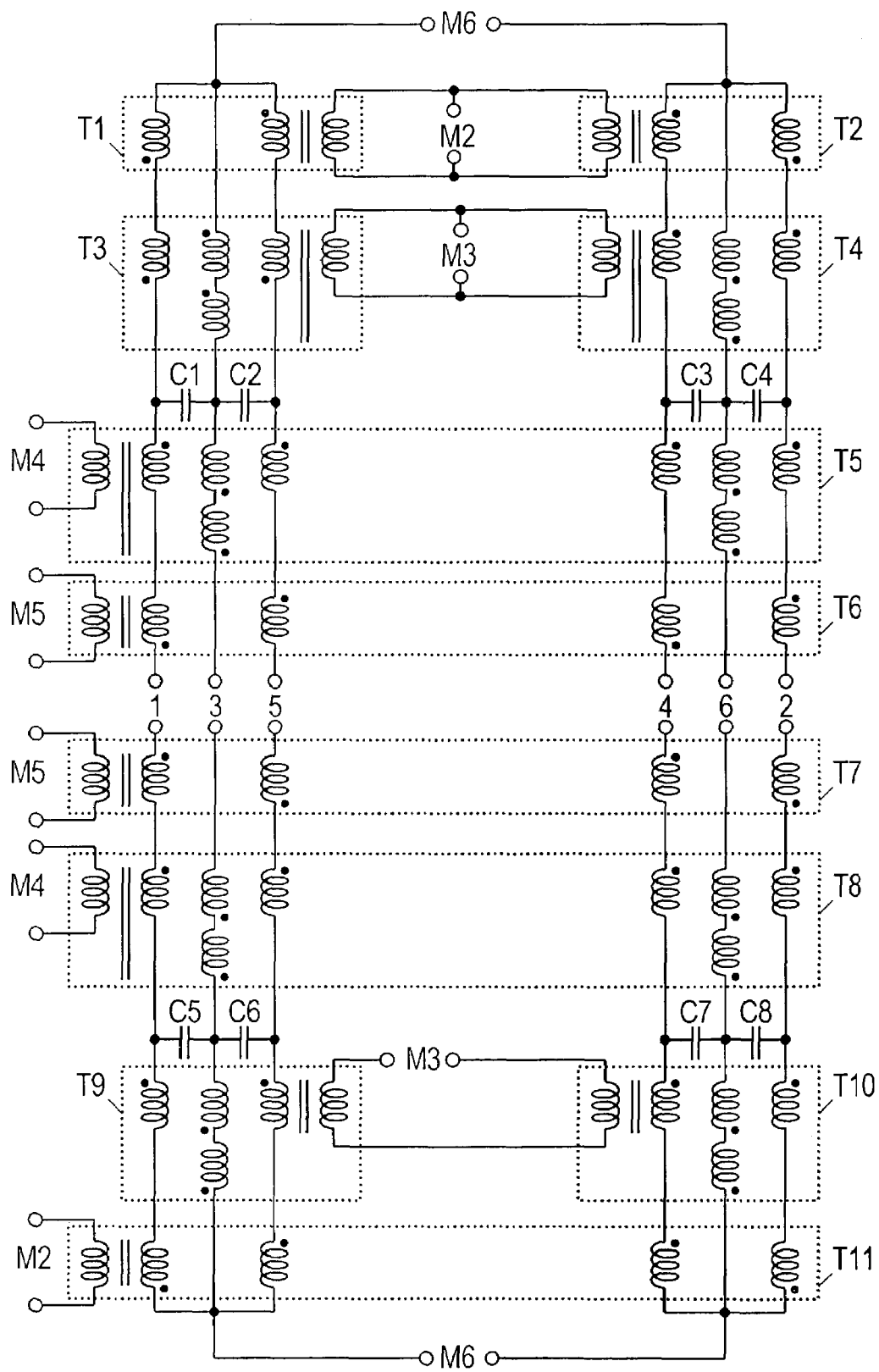
FIG. 5 shows orthogonal mode transmission and receiving circuitry.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative placement of the surface and subsurface pieces of equipment.

DETAILED DESCRIPTION

Turning now to the figures, FIG. 1 shows a well during wireline logging operations. A drilling platform 102 is equipped with an optional derrick 104 that supports a hoist 106. Drilling of oil and gas wells is commonly carried out by a string of drill pipes connected together by "tool" joints so as to form a drilling string that is lowered through a rotary table 112 into a wellbore 114. In FIG. 1, it is assumed that the drilling string has been temporarily removed from the wellbore 114 to allow a sonde 116 to be lowered by a wireline 108 into the wellbore 114. Typically, the sonde 116 is lowered to the bottom of the region of interest and subsequently pulled upward at a constant speed. During the upward trip, the sonde 116 performs measurements on the formations 119 adjacent to the wellbore 114 as the sonde 116 passes by. The measurement data are communicated to a logging facility 120 for storage, processing, and analysis. The sonde and the logging facility 120 preferably employ telemetry transmitters and receivers using discrete multi-tone (DMT) modulation having repeated symbols.

It is noted that the following telemetry system discussion will be presented in the context of a wireline system. However, it is recognized that this telemetry system may also be used for MWD, and the claims are not limited to wireline systems.

FIG. 2A shows a cross-section of a typical wireline cable having multiple conductors 202. Each of the conductors 202 is surrounded by an insulating jacket 204. The insulated conductors 202 are bundled together in a semi-conductive wrap 205, which is surrounded by two layers of counter-would metal armor wire 206. Being made of metal, the armor wires 206 are conductive and may be used as an eighth conductor. For the sake of convenience, FIG. 2B shows a cross-section of the same wireline cable having its conductors numbered 1–7 and its armor labeled A. This notation will be used in describing the use of transmission modes below. In wireline logging of cased and cemented wells, a single conductor logging cable such as that shown in FIG. 3 may be preferred. The single conductor cable typically has a single, multi-stranded conductor 302 encased in insulative material 304 and wound within a fabric liner 306 which is in turn wound within a double layer of counter wound metal armor wires 308. FIG. 4. shows a cross-section of yet another alternative: composite tubing 402 with embedded conductors 404. The conductors 404 are preferably equally spaced around the circumference of the tubing, and wound helically along its length.

Power and telemetry are typically conveyed together on a single cable. In single conductor cables, the power is generally transmitted as a low frequency signal, whereas the telemetry signal(s) are transmitted in a higher frequency band. In multi-conductor cables, the signal isolation is further improved by the use of orthogonal transmission modes.

FIG. 5 shows one embodiment of telemetry circuitry that makes use of orthogonal transmission modes. The surface equipment includes mode transformers T1 through T6, and capacitors C1 through C4. The mode transformers induce voltages on conductors 1–6 of the multiconductor cable in response to voltages supplied to their primary windings. The combination and polarity of the voltages imposed on the conductors forms a transmission mode that is designed to be orthogonal to each of the other transmission modes. Signals carried via the different transmission modes can be independently received by similarly configured mode transformers T7–T11 in the downhole equipment. Similarly, signals may be transmitted uphole using the orthogonal modes by exciting the primaries of the appropriate downhole mode transformers, and the respective surface mode transformers can extract the mode signals without interference from signals carried in other modes. In short, the use of transmission modes eliminates signal cross-talk which would otherwise be caused by inductive and capacitive coupling between the conductors in the multi-conductor cable.

Power is supplied to terminals M6 for transport downhole via mode M6. To activate mode M6, conductors 1, 3, and 5 are placed at one polarity while the three remaining conductors 2, 4, and 6, must be placed at the opposite polarity. Since this is done by direct connection in FIG. 5 as opposed to transformer coupling, the mode M6 voltage may be either AC or DC. The power provided to mode M6 at the surface may preferably be as high as 1300 volts at 3 amps.

Power may also be supplied to terminals M2 for transport downhole. Mode M2 power is excited on conductors 1–6 by driving conductors 1 and 2 with one polarity while driving conductors 4 and 5 with the opposite polarity. Power transmitted via this modes may preferably be limited to less than 240 watts, with 120 watts delivered to the load at the opposite end of the cable.

Power supplied to terminals M3 is impressed by transformer T3 as a potential between conductor 3 and conductors 1 and 5, and by transformer T4 as an equal but opposite potential between conductor 6 and conductors 2 and 4. This excites mode M3 in the cable.

Transformers T1–T4 are power transformers which may have windings with a significant series inductance. This series inductance may effectively form an open circuit to signals transmitters at typical telemetry frequencies. To counteract this effect, the circuit of FIG. 5 has capacitors C1 through C4 to provide closed current paths at typical telemetry frequencies.

Mode transformer T5 operates to transmit and receive telemetry signals. Signals provided to terminals M4 are impressed as a potential between conductor 3 and conductors 1 and 5, and as an equal potential between conductor 6 and conductors 2 and 4. This excites mode M4 in the cable. The voltages at terminals M4 also reflect mode M4 signals received from downhole by mode transformer T8.

Mode transformer T6 similarly operates to transmit and receive telemetry signals. Signals provided to terminals M5 are impressed by driving conductors 1 and 4 with one polarity while driving conductors 2 and 5 with the opposite polarity. This excites mode M5 in the cable. The voltages at terminals M5 also reflect mode M5 signals transmitted from downhole by mode transformer T7.

In the downhole equipment, mode transformers T7 and T8, with the help of capacitors C5–C8, operate similarly to mode transformers T5 and T6 to send and receive telemetry signals via modes M5 and M4, respectively. Transformers T9 and T10 receive mode M3 power and provide it at terminals M3. Transformer T11 receives mode M2 power and provides it to the terminals marked M2. Mode M6 power is available at terminals M6.

Eigenmode transmission in multiconductor cables is treated by David F. Strawe in the Boeing Co. report number D2-19734-1 "Analysis of Uniform Symmetric Transmission Lines" Jan. 27, 1971, and in Boeing Co. report number D2-26245-1 "Analysis of the controlled-Lay Cable" January 1973. Additional information can be found in "Multiconductor Transmission Line Analysis", by Sidnely Frankel, Artech House Inc., 1977, "Analysis of Multiconductor Transmission Lines (Wiley Series in Microwave and Optical Engineering), Clayton R. Paul, 1994, and in U.S. Pat. No. 3,603,923 dated Sep. 10, 1968 by Nulligan describing equipment using eigenmode transmission on a multiconductor cable. Orthogonal modes and the circuit of FIG. 5 are discussed in much greater detail in co-pending application Ser. No. 09/437,594, entitled "High-Power Well Logging Method And Apparatus" by inventors G. Baird, C. Dodge, T. Henderson and F. Velasquez. These references are hereby incorporated by reference.

Accordingly, there are at least two methods for establishing a communications channel for downhole communications. One of several orthogonal transmission modes may be used to carry the telemetry signal on a multiconductor cable, or a single conductor cable may be used to carry the telemetry signal in the normal fashion. In any case, it is desirable to maximize the rate at which information may be conveyed across the communications channel.

Information is typically conveyed by modulation of a carrier signal. One modulation technique which may be preferred for this application is discrete multi-tone (DMT) modulation. DMT modulation is used in Asymmetrical Digital Subscriber Line (ADSL) systems. ADSL systems commonly communicate via "twisted wire pair" cables. The available bandwidth for a long twisted pair cable extends in frequency to approximately 1.1 MHz. DMT modulation effectively divides the available bandwidth of the system into sub-channels 4.3125 kHz wide, giving 256 possible sub-channels in the 1.1 MHz bandwidth. Traditional ADSL reserves the first sub-channel (from 0–4 kHz) for audio telephone signals, and typically provides a guard band separating the sub-channels for communication from the traditional telephone service band.

In the ideal case, each frequency sub-channel, or bin, would have the same data transmission rate as all the other frequency sub-channels. However, the data rate for each sub-channel varies for a myriad of reasons. For example, interference having a particular frequency may affect certain sub-channels whose frequency is at or near the frequency of the noise source. In this instance, those sub-channels with frequencies about the same as the noise source have lower signal to noise ratios and therefore their data carrying capacity is lower than other channels. In addition to interference from outside sources, the twisted pair cable itself may have an affect on the data carrying capacity of each sub-channel. Resistive and capacitive effects in the cable cause a frequency-dependent attenuation of the signals passing therethrough. The cable attenuation generally varies smoothly as a function of frequency with increasing attenuation at higher frequencies. Other system components, such as transformers or suboptimal impedance matching connectors, may further aggravate attenuation at selected frequencies. To compensate for line impairments of a twisted pair cable, the preferred embodiment measures the data transmission capability of each sub-channel and assigns a data transmission rate for that sub-channel to insure that each channel is used at its maximum reliable data transmission rate given its signal to noise ratio.

For downhole communication systems, the sub-channels are preferably divided into an upstream band and a downstream band. The usable bandwidth between 0 and 1.1 MHz is preferably divided into 256 equally spaced subchannels each 4.3125 kHz wide. Some of the subchannels may be reserved for dedicated purposes. For example, assuming that the subchannels are numbered in order from low frequency to high frequency, subchannel #84 may be reserved for a pilot signal. A lower subchannel #1 may be unused to provide a guard band for power signals. Some applications may call for 4 kHz power and allowance for harmonics may be desired.

It is noted that the uplink and downlink information transfer rate requirements are generally not static as is assumed in most communication systems designs. During initialization and configuration of downhole instruments, it is desirable to provide a downlink information transfer capacity that is substantially larger than the uplink information transfer capacity. The downlink is used to transfer software, commands, and parameters, and the role of the uplink is generally limited to acknowledging receipt of information packets. During normal operation, the downlink is generally limited to acknowledgements, while the uplink carries measurement data and status information. Other channel definitions and divisions are also contemplated for use with various embodiments of the present invention.

FIG. 6 shows a block diagram of a DMT transmitter 602. It includes a data framer 604, a scrambler 606, an encoder 608, an interleaver 610, a tone mapper 612, an inverse discrete Fourier transform (IDFT) block 614, a cyclic prefix generator 616, and a line interface 618. The data framer 604 groups bytes of uplink data together to form data frames. The data frames are then grouped together with a synchronization frame and a cyclic redundancy checksum (CRC) which is calculated from the contents of the data frames. The CRC provides one means for detecting errors in data received at the receiving end. The scrambler 606 combines the output of the data framer 604 with a pseudo-random mask. This "randomizes" the data so as to flatten the frequency spectrum of the data signal. The scrambled data is encoded by the encoder 608 with an error correction code that adds redundancy to the data stream. The redundancy may be used to detect and correct errors caused by channel interference. A Reed-Solomon (RS) code is preferred, but other error correction codes may also be used.

The interleaver 610 is preferably a convolutional interleaver which reorders data stream symbols so as to "spread out" previously adjacent symbols. This prevents an error burst from overcoming the localized error correction ability of the error correction code. The tone mapper 612 takes bits from the data stream and assigns them to frequency bins. For each frequency bin, the bits are used to determine a discrete Fourier transform (DFT) coefficient that specifies a frequency amplitude. The number of bits assigned to each frequency bin is variable (i.e. may be different for each bin) and dynamic (i.e. may change over time), and depends on the estimated error rate for each frequency. Microcontrollers (not shown) at each end cooperate to determine the error rate detected by the receiver in each frequency band, and to adjust the tone mapper accordingly. The coefficients provided by the tone mapper 612 are processed by the IDFT block 614 to generate a time-domain signal carrying the desired information at each frequency in the form of a DMT symbol.

In one embodiment, the cyclic prefix block 616 duplicates the end portion of the time-domain signal and prepends it to the beginning of the time domain signal along with a copy of the time-domain signal. In this embodiment, the cyclic prefix includes a copy of the symbol in the cyclic prefix. As discussed further below, this permits frequency domain equalization of the signal at the receiving end, as well as an increased signal-to-noise ratio. The prefixed symbol is then converted into analog form, filtered, and amplified for transmission across the communications channel by line interface 618.

In another embodiment, the cyclic prefix block 616 duplicates the end portion of the time-domain signal and prepends it to the beginning of the time-domain signal. In this embodiment, a copy of the time-domain signal is also appended to the end of the time-domain symbol. The cyclic prefix includes the end portion of the symbol. The prefixed symbol is then converted into analog form, filtered, and amplified for transmission across the communications channel by line interface 618.

A block diagram of a DMT receiver 702 is shown in FIG. 7. It includes a line interface 704, a cyclic prefix stripper 706, a DFT block 708, a frequency domain equalizer 710, a constellation decoder 712, a de-interleaver 714, an error correction decoder 716, a descrambler 718, and a de-framer 720. The line interface 704 filters the received signal, converts it to digital form, and performs any desired time domain equalization. The time domain equalization at least partially compensates for distortion introduced by the channel, but it is likely that at least some intersymbol interference will remain.

In one embodiment, the stripper block 706 removes part of the cyclic prefix that was added by the prefix block 716, but importantly, trailing intersymbol interference from the cyclic prefix remains in the signal. Note that in this embodiment, that part of the cyclic prefix that is a copy of the symbol is not stripped by the stripper block 706. In this embodiment, the DFT block 708 performs a DFT on the signal, including the symbol and the copy of the symbol from the cyclic prefix, to obtain the frequency coefficients.

In another embodiment, the stripper block 706 removes the cyclic prefix that was added by the prefix block 716, but importantly, trailing intersymbol interference from the cyclic prefix remains in the signal. In this embodiment, the DFT block 708 performs a DFT on the signal, including the symbol and the copy of the symbol, to obtain the frequency coefficients. If desired, frequency domain equalization may be performed by the block 710 to compensate for any remaining intersymbol interference.

If desired, frequency domain equalization may be performed by block 710 to compensate for any remaining intersymbol interference. It is noted that frequency domain equalization on DFT coefficients is a cyclic convolution operation which would lead to incorrect equalization results had the cyclic prefix not been transmitted across the channel.

Having two copies of the symbol available to the DFT block 708 allows for various implementations of the DFT block 708. In one implementation, each copy of the symbol may be transformed separately and the results averaged. In another implementation, the copies of the symbol may be transformed together. Other implementations are within the level of skill of those skilled in the art.

The constellation decoder 712 extracts the data bits from the frequency coefficients using an inverse mapping of the tone mapper 712. The de-interleaver 714 then returns the data stream to its original order. The decoder 716 decodes the data stream correcting such errors as are within its correcting ability, and descrambler 718 combines the data with the pseudo-random mask to return the data to its unscrambled form. The de-framer 720 then identifies and removes synchronization information, and determines if the CRC indicates the presence of any errors. If error free, the data is forwarded to the output. Otherwise, the microcontroller is notified of errors in the data.

Taken together, FIGS. 6 and 7 show how uplink telemetry can be conveyed across a communications channel according to various embodiments of the present invention. Downlink communications can be similarly conveyed. The components may be implemented as discrete hardware, or preferably may be implemented as software of a digital processor within the modem.

FIG. 8 shows one method of configuring the communications channel. The surface transceiver executes a configuration routine 802 that begins with an activation block 804. In this block, the modems are both powered on, and a handshake phase is performed. The modems each transmit single tones to identify themselves and determine which one will control the timing of the channel. The activation block is followed by a training block 806 in which each modem takes turns transmitting wideband signals. The wideband signals allow each unit to calculate the received power spectral density, to adjust automatic gain controls, and to perform initial training of the equalizers in each receiver. The training block is followed by an analysis block 808. In the analysis block, the two modems communicate capabilities and configuration information to each other. This information preferably includes desired information transmission rates. In the exchange block 810, the modems negotiate a mutually acceptable configuration.

Figure 9:
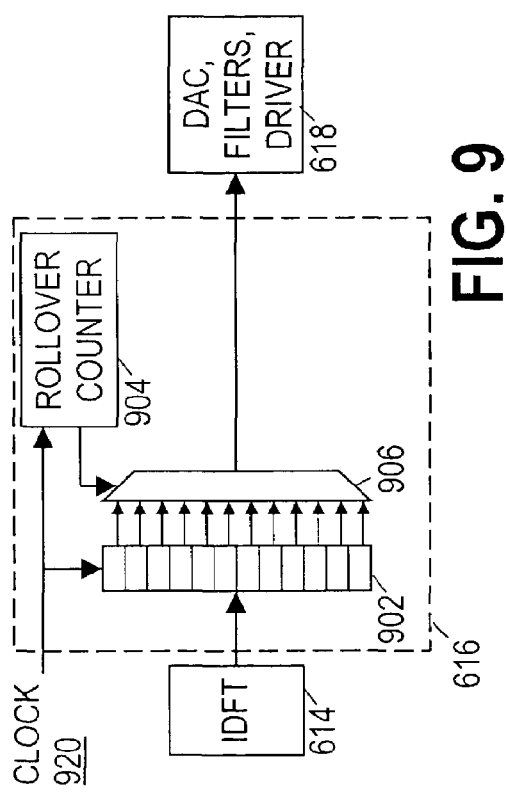
FIG. 9 shows an embodiment of the cyclic prefix generator of the discrete multi-tone transmitter of FIG. 6.

FIG. 9 shows an embodiment of the cyclic prefix generator 616. As shown in the embodiment of FIG. 9, the cyclic prefix generator 616 includes a latch 902 and a rollover counter 904. The cyclic prefix generator 616 accepts the symbol from the IDFT block 614 and a clock signal and provides the bits in the cyclic prefix and the symbol to the line interface 618. The latch 902 is configured to store the symbol as provided by the IDFT block 614. The latch 902 provides the symbol to the multiplexer 906, which converts the symbol from parallel form into serial form to be provided to the line interface 618. The rollover counter 904 accepts the clock signal and uses the clock signal to reset the rollover counter 904 to an initial value.

The initial value may, for example, be bit 32 of a 64-bit symbol. Other bit locations may also be chosen as desired. The clock may be a symbol clock, aligned with the start of each symbol or any other signal so aligned. Note that the multiplexer 906 is symbolic only and the functionality of the multiplexer 906 may be implemented in discrete logic, as desired.

Note that the cyclic prefix generator 616 shown in FIG. 9 may be used to implement either the cyclic prefix that includes the symbol or the additional copy of the symbol. The rollover counter 904 is reset with the clock to the preset bit of the symbol. The multiplexer 906 provides the bits of the symbol starting at the preset bit through the end of the symbol. The rollover counter rolls over to the first bit of the symbol and runs through the symbol bits twice. The rollover counter is reset for the next symbol.

Figure 10:
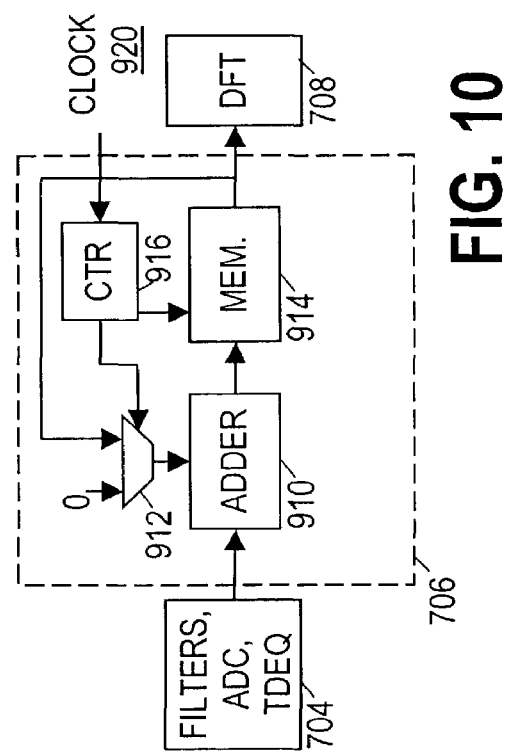
FIG. 10 shows an embodiment of the cyclic prefix stripper of the discrete multi-tone receiver of FIG. 7.

FIG. 10 shows an embodiment of the cyclic prefix stripper 706. As shown in the embodiment of FIG. 10, the cyclic prefix stripper 706 includes an adder 910, a multiplexer 912, a memory 914, and a controller 916. The adder 910 accepts the bits from the line interface 704 as well as the output of the multiplexer 912. The first time through the bits of the symbol, the adder adds a zero to each value. The second time through the bits of the symbol, the controller 916 directs the multiplexer 912 to provide the bits from the memory 914. The adder 910 provides the combined bits to the memory 914. The memory 914 stores the values of the bits for the symbol and provides the values to the DFT block 708 and the multiplexer 912. The controller 916 accepts the clock signal as an indication of the start of the symbol.

As the cyclic prefix passes through the adder 910 and into the memory 914, the memory 914 may discard the bits of the cyclic prefix, store the bits in unused memory locations, or store the bits in non-existent memory locations, effectively eliminating them. Note that the DFT block 708 may be configured to ignore some bits, such as the cyclic prefix bits or the bits from single copies of the symbol. The DFT block 708 may also use the two copies of the symbol to perform a consistency check by calculating twice and comparing the results.

Note that a traditional cyclic prefix includes only a portion of the symbol, not the entire symbol. For a 64-sample symbol there would be perhaps a 32-sample prefix for 96 samples per symbol. Note that these numbers may result from the extreme conditions encountered in the downhole environment. One embodiment of the present invention includes what could be described as a traditional cyclic prefix and two copies of the symbol. Thus, there are 160 samples per symbol. Note that this results in a signal-to-noise ratio (SNR) gain, up to an additional 1.5 dB, which should allow for additional information to be carried by each symbol, i.e. longer symbol lengths.

FIG. 11 shows a diagram of a cyclic prefix followed by two copies of a symbol, according to one aspect of the present invention, and a cyclic prefix including a symbol followed by the symbol, according to another aspect of the present invention. In one illustrated embodiment, the cyclic prefix 950 has a length shorter than the length of the symbol 960 that follows it. The copy 962 of the symbol follows the symbol 960. In the other illustrated embodiment, the cyclic prefix 952 is longer in length than the symbol 960 that follows it. The cyclic prefix 952 includes the symbol 960.

In a downhole telemetry system, the surface modem is programmed to assert priority in determining what an acceptable configuration is. The surface modem is also programmed to determine the desired information transmission rate based on the operating mode of the system. In the initialization phase of the system, the surface modem is programmed to configure the channel with a greater than normal number of downlink subchannels and a reduced number of uplink subchannels. In the normal operating phase of the system, the surface modem is programmed to configure the channel with a normal number of downlink subchannels, and the maximum number of uplink subchannels.

The above discussion is meant to be illustrative of the principles and various embodiments of the present invention. For example, the present invention has been discussed in the context of wireline logging. However, it may also prove advantageous in the context of LWD, particularly in when composite tubing is used. One particular transmission medium may be a long hollow non-conducting pipe with six equally spaced electrical conductors embedded within the wall of the flexible pipe. Numerous other variations and modifications will become apparent to those skilled in the art once the above disclosure is fully appreciated. It is intended that the following claims be interpreted to embrace all such variations and modifications.

What is claimed is:

1. A downhole telemetry system using discrete multitone modulation, wherein the system comprises:
   a surface receiver;
   and
   a downhole transmitter coupled to the surface receiver, wherein the downhole transmitter communicates to the surface receiver using a time-domain signal having a cyclic prefix for a symbol at least as long as a length of the symbol.

2. The downhole telemetry system of claim 1 wherein a given cyclic prefix precedes a given symbol, and wherein the given cyclic prefix comprises the given symbol.

3. The downhole telemetry system of claim 2 wherein the given symbol consists of a first set of values and a second set of values, wherein the cyclic prefix further comprises the second set of values followed by the given symbol.

4. The downhole telemetry system of claim 2 wherein the discrete multi-tone modulation further comprises the cyclic prefix for each symbol longer than said each symbol.

5. The downhole telemetry system of claim 4 wherein for each given symbol a given cyclic prefix precedes the given symbol, and wherein the given cyclic prefix comprises the given symbol.

6. The downhole telemetry system of claim 5 wherein the given symbol consists of a first set of values and a second set of values, wherein the given cyclic prefix further comprises the second set of values followed by the given symbol.

7. The downhole telemetry system of claim 5 wherein the surface receiver is configured to combine the given symbol with the given symbol from the cyclic prefix to form a combined symbol.

8. The downhole telemetry system of claim 7 wherein the surface receiver is further configured to demodulate the combined symbol.

9. The downhole telemetry system of claim 1 wherein the symbol length comprises at least 64 data points.

10. The downhole telemetry system of claim 1 that further comprises:
a surface transmitter; and
a downhole receiver coupled to the surface transmitter.

11. The downhole telemetry system of claim 10, wherein a surface transceiver comprises the surface transmitter and the surface receiver, and wherein a downhole transceiver comprises the downhole transmitter and the downhole receiver.

12. A method of communicating with a downhole package using discrete multitone modulation, wherein the method comprises:
receiving a time-domain signal carrying desired information at specific frequencies, wherein the time-domain signal comprises at least one symbol; and
prepending a cyclic prefix having first length to the beginning of the at least one symbol having a second length no longer than the first length.

13. The method of claim 12, wherein prepending the cyclic prefix having the first length to the beginning of the at least one symbol having the second length no longer than the first length further comprises prepending to the at least one symbol having the second length the cyclic prefix that comprises the at least one symbol within the first length.

14. The method of claim 13 wherein prepending to the at least one symbol having the second length the cyclic prefix that comprises the at least one symbol within the first length comprises prepending to the at least one symbol having the second length the cyclic prefix that comprises an end portion of the at least one symbol followed by the at least one symbol.

15. The method of claim 13, wherein the method further comprises:
combining the at least one symbol and the at least one symbol from the cyclic prefix to form a combined symbol; and
demodulating the combined symbol.

16. The method of claim 12, wherein receiving the time-domain signal carrying the desired information at the specific frequencies, wherein the time-domain signal comprises at least one symbol further comprises receiving the time-domain signal carrying the desired information at the specific frequencies, wherein the time-domain signal comprises a plurality of symbols; wherein the method further comprises:
prepending to the beginning of each of the plurality of symbols, each of the plurality of symbols having a respective length, a cyclic prefix having a length at least equal to the respective length.

17. The method of claim 16, wherein prepending to the beginning of each of the plurality of symbols, each of the plurality of symbols having the respective length, the cyclic prefix having the length at least equal to the respective length further comprises prepending to the beginning of each respective symbol of the plurality of symbols the cyclic prefix that comprises the respective symbol.

18. The method of claim 17, wherein prepending to the beginning of each respective symbol of the plurality of symbols the cyclic prefix that comprises the respective symbol further comprises prepending to the beginning of each respective symbol of the plurality of symbols the cyclic prefix that comprises an end portion of the respective symbol followed by the respective symbol.

19. The method of claim 17, the method further comprising:
combining for each of the plurality of symbols the respective symbol and the respective symbol from the cyclic prefix to form a combined respective symbol; and
demodulating each combined respective symbol.

20. The method of claim 13, wherein receiving the time-domain signal carrying the desired information at the specific frequencies, wherein the time-domain signal comprises the at least one symbol comprises receiving the time-domain signal carrying the desired information at the specific frequencies, wherein the time-domain signal comprises the at least one symbol having at least 64 data points.

21. A downhole telemetry system using discrete multitone modulation, wherein the system comprises:
a surface receiver; and
a downhole transmitter coupled to the surface receiver, wherein the downhole transmitter communicates to the surface receiver using a time-domain signal having a symbol followed immediately by a copy of the symbol.

22. The downhole telemetry system of claim 21, wherein the surface receiver is configured to combine the symbol and the copy of the symbol to form a combined symbol.

23. The downhole telemetry system of claim 22, wherein the surface receiver is further configured to demodulate the combined symbol.

24. The downhole telemetry system of claim 21, wherein preceding the symbol is a cyclic prefix that comprises an end portion of the symbol.

25. The downhole telemetry system of claim 21, wherein the symbol length comprises at least 64 data points.

26. The downhole telemetry system of claim 21 that further comprises:
a surface transmitter; and
a downhole receiver coupled to the surface transmitter.

27. The downhole telemetry system of claim 21, wherein a surface transceiver comprises the surface transmitter and the surface receiver, and wherein a downhole transceiver comprises the downhole transmitter and the downhole receiver.

28. A method of communicating with a downhole package using discrete multitone modulation, wherein the method comprises:
receiving a time-domain signal carrying desired information at specific frequencies, wherein the time-domain signal comprises at least one symbol; and
appending a copy of the at least one symbol to the end of the at least one symbol.

29. The method of claim 28, wherein the method further comprises:
combining the at least one symbol and the copy of the at least one symbol to form a combined symbol; and
demodulating the combined symbol.

30. The method of claim 28, wherein the method further comprises:
prepending to the at least one symbol a cyclic prefix that comprises an end portion of the at least one symbol.

31. The method of claim 28, wherein receiving the time-domain signal carrying the desired information at the specific frequencies, wherein the time-domain signal comprises at least one symbol further comprises receiving the time-domain signal carrying the desired information at the specific frequencies, wherein the time-domain signal comprises a plurality of symbols; and wherein appending the copy of the at least one symbol to the end of the at least one symbol further comprises appending a copy of each respective symbol of the plurality of symbols to the end of said each respective symbol.

32. The method of claim 31, wherein the method further comprises:
wherein the method further comprises:
combining for each respective symbol the respective symbol and the copy of each respective symbol to form a combined respective symbol; and demodulating each combined respective symbol.

33. The method of claim 31 wherein prepending to the at least one symbol the cyclic prefix that comprises the end portion of the at least one symbol further comprises prepending to said each respective symbol the cyclic prefix that comprises the end portion of said each respective symbol.

34. A method of communicating with a downhole package using discrete multitone modulation, wherein the method comprises:
receiving a digital form of a time-domain signal that comprises at least one symbol having a cyclic prefix that comprises a copy of the at least one symbol;
stripping a portion of the cyclic prefix other than the copy of the at least one symbol; and
transforming the digital form using the at least one symbol and the copy of the at least one symbol.

35. The method of claim 34, wherein receiving the digital form of the time-domain signal that comprises the at least one symbol having the cyclic prefix that comprises the copy of the at least one symbol further comprises receiving the digital form of the time domain signal that comprises a plurality of symbols, each respective symbol of the plurality of symbols having a respective cyclic prefix that comprises the copy of the respective symbol, and wherein stripping the portion of the cyclic prefix other than the copy of the at least one symbol further comprises stripping the portion of each respective cyclic prefix other than the copy of the respective symbol, and wherein transforming the digital form using the at least one symbol and the copy of the at least one symbol further comprises transforming the digital form using each respective symbol and the copy of the respective symbol.

36. A method of communicating with a downhole package discrete multitone modulation, wherein the method comprises:
receiving a digital form of a time-domain signal that comprises at least one symbol having a cyclic prefix followed by a copy of the at least one symbol;
stripping the cyclic prefix from the copy of the at least one symbol; and
transforming the digital form using the at least one symbol and the copy of the at least one symbol.

37. The method of claim 36, wherein receiving the digital form of the time-domain signal that comprises the at least one symbol having the cyclic prefix followed by the copy of the at least one symbol further comprises receiving the digital form of the time-domain signal that comprises a plurality of symbols, each respective symbol of the plurality of symbols having a respective cyclic prefix followed by the copy of the respective symbol, wherein stripping the cyclic prefix from the copy of the at least one symbol further comprises stripping the respective cyclic prefix from the copy of the respective symbol, and wherein transforming the digital form using the at least one symbol and the copy of the at least one symbol further comprises transforming the digital form using each of the plurality of symbols and the copy of each respective symbol.

38. The method of claim 36, wherein transforming the digital form using the at least one symbol and the copy of the at least one symbol comprises:
adding the at least one symbol sample by sample to the copy of the at least one symbol to obtain a combined symbol; and
performing a discrete Fourier transformation on the combined symbol.

* * * * *